(12) United States Patent
Dwivedi et al.

(10) Patent No.: US 12,434,913 B1
(45) Date of Patent: Oct. 7, 2025

(54) SYSTEMS AND METHODS FOR CONTAINER SHUTTLE CALIBRATION

(71) Applicant: Amazon Technologies, Inc., Seattle, WA (US)

(72) Inventors: Rajeev Dwivedi, Sammamish, WA (US); Michael Alan Bray, Elkhorn, NE (US); Vivek S. Narayanan, Franklin, TN (US); Ganesh Krishnamoorthy, Seattle, WA (US); Mohit Malik, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1018 days.

(21) Appl. No.: 17/509,325

(22) Filed: Oct. 25, 2021

(51) Int. Cl.
*B65G 1/137* (2006.01)
*B65G 1/04* (2006.01)
*B65G 1/06* (2006.01)
*B65G 54/02* (2006.01)
*G06Q 10/087* (2023.01)
*H02K 11/215* (2016.01)
*H02K 41/03* (2006.01)

(52) U.S. Cl.
CPC ......... *B65G 1/1378* (2013.01); *B65G 1/0492* (2013.01); *B65G 1/065* (2013.01); *B65G 54/02* (2013.01); *G06Q 10/087* (2013.01); *H02K 11/215* (2016.01); *H02K 41/031* (2013.01)

(58) Field of Classification Search
CPC .... B65G 1/1378; B65G 1/0492; B65G 1/065; B65G 54/02; G06Q 10/087; G01B 3/00; H02K 11/215; H02K 41/031
See application file for complete search history.

(56) References Cited

U.S. PATENT DOCUMENTS

| | | | | |
|---|---|---|---|---|
| 5,334,892 | A * | 8/1994 | Chitayat | H02K 41/031 310/12.13 |
| 7,746,023 | B2 * | 6/2010 | Ajima | G01D 5/2046 318/700 |
| 9,548,638 | B2 * | 1/2017 | Komatsu | H02K 41/03 |
| 10,476,413 | B2 * | 11/2019 | Weber | H02K 41/031 |
| 10,562,715 | B2 * | 2/2020 | Huang | G05B 19/0421 |
| 11,381,181 | B2 * | 7/2022 | Figie | H02P 6/006 |
| 11,904,700 | B2 * | 2/2024 | Elsperger | B60L 13/06 |
| 2012/0096724 | A1 * | 4/2012 | Eyermann | G01B 3/00 33/354 |
| 2016/0052716 | A1 * | 2/2016 | Schnabl | B65G 1/065 414/273 |
| 2023/0138603 | A1 * | 5/2023 | Dwivedi | B65G 1/0478 414/277 |

FOREIGN PATENT DOCUMENTS

JP 6294668 B2 * 3/2018 ............. B21D 51/36

* cited by examiner

*Primary Examiner* — Thomas Randazzo
(74) *Attorney, Agent, or Firm* — Eversheds Sutherland (US) LLP

(57) ABSTRACT

Systems and methods are disclosed for systems and methods for container shuttle calibration. An example method for calibration of a shuttle coupled to a permanent magnet may include positioning the shuttle on a calibration table, energizing an electromagnet coupled to the calibration table, and determining a detected edge of the permanent magnet. Some methods may include determining a first location to position a connector of the shuttle along an X-axis based at least in part on the detected edge and a mechanical template coupled to the calibration table, and securing the connector in the first location.

20 Claims, 9 Drawing Sheets

SYSTEMS AND METHODS FOR CONTAINER SHUTTLE CALIBRATION

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
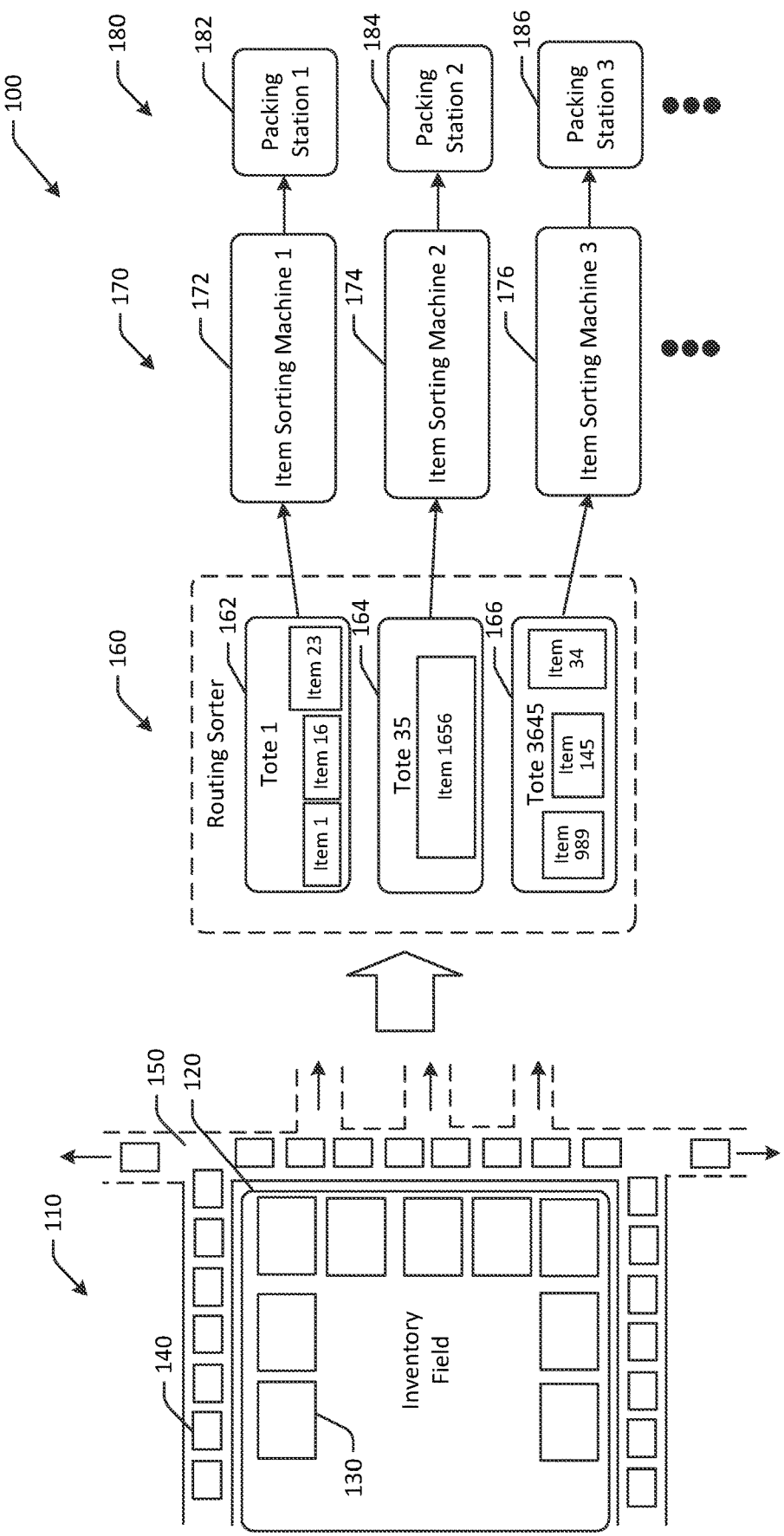
FIG. 1 is a hybrid schematic illustration of an example use case for systems and methods for container shuttle calibration in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, a container of items may be loaded onto a shuttle, and the shuttle may transport the container from an inventory field to a sortation system or other location. Shuttles may be used to transport containers and/or one or more items from a first location to a second location.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Container shuttles may be in continuous or semi-continuous operation and may move at relatively high speeds, such as speeds of three meters per second or more, and may have highly precise positioning. As a result of such movement, container shuttles may become uncalibrated over time, or may slowly move beyond positional tolerances. Shuttle calibration may also be affected by actual positioning of a permanent magnet for systems where electromagnetic propulsion is used to move the shuttle. For example, a permanent magnet may be positioned in a certain location underneath the shuttle, where the positioning may vary from shuttle to shuttle. In addition, such permanent magnets may interact with linear synchronous motors disposed along a track to propel the shuttle. The actual positioning of the permanent magnet with respect to its housing (or with respect to a frame or other component of the shuttle) may vary amongst shuttles, which may lead to incremental differences in shuttle positioning when interacting with a linear synchronous motor. For example, if a shuttle is to move to a certain position along a track, the shuttle position may be determined based at least in part on a position of the permanent magnet of the shuttle with respect to a particular linear synchronous motor. Due to differences in permanent magnet positioning, the position along the track with respect to a particular linear synchronous motor may vary. Such differences may be important when aligning a power connector of the shuttle with a power connector along the track. Other types of connectors may also need to be aligned, such as data transfer connectors, although examples of the disclosure are related to power connectors. Accordingly, shuttles may have to increment back or forth in order to engage connectors disposed along the track or elsewhere.

To calibrate shuttles, the shuttles may be disengaged from a shuttle rail system and then removed from the shuttle rail system. For instance, certain shuttles may include one or more magnets, such as permanent magnets, underneath the shuttle that interact with electromagnets disposed along a set of rails. The permanent magnet and electromagnets may work together to form a linear induction motor that propels the shuttle. Because the shuttles may be propelled via electromagnetic propulsion, the shuttle may have to be disengaged from the shuttle rail system to avoid magnetic interaction before the shuttle can be removed from the shuttle rail system.

Embodiments of the disclosure provide systems and methods for container shuttle calibration that allow for offline shuttle calibration of, for example, a permanent magnet of the shuttle based on its actual positioning with respect to a linear synchronous motor. A physical edge of a housing of the permanent magnet may be different than an actual edge of the permanent magnet inside the housing, which may affect positioning of the shuttle when engaged with the linear synchronous motor. Embodiments may use a detected edge of the permanent magnet, as indicated when engaged with the linear synchronous motor, to position connectors, such as power connectors or other connectors, on the shuttle, such that the shuttle can continuously engage with connectors along the track with minimal incremental movement. Embodiments may improve shuttle positional accuracy to provide increased consistency of establishment of physical connections for power, control signals, etc. from connectors disposed along a track or elsewhere in the system. Embodiments may correlate a physical edge of the permanent magnet of a shuttle with respect to its detectable edge (e.g., where the detectable edge is determined when engaged with a linear synchronous motor, etc.). Some embodiments include a mechanical template fixture used to define a position of shuttle wheels, belts, and/or a position of a connector. Some embodiments include a calibration table having a linear synchronous motor and rail arrangement, where a shuttle can be calibrated by positioning the shuttle at a controlled optimal datum of the linear synchronous motor. As a result of the improve functionality provided by the shuttle calibration systems and methods described herein, flexibility of the processing of items at the fulfillment center may be increased, such as by providing the ability to quickly and accurately position shuttles at particular locations. Some embodiments include optimized process flows for processing of orders at fulfillment centers, as well as process flows or methods to increase speed of consolidating products in a multi-item order as a result of improved speed in transportation of items and/or containers. As a result, throughput of fulfillment centers may be improved, and/or logistics of fulfillment center operations may be less complicated.

Referring to FIG. 1, an example use case 100 for systems and methods for container shuttle calibration is depicted in accordance with one or more embodiments of the disclosure. Although discussed in the context of online orders, other embodiments may be directed to any suitable use case where containers or items are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include rails that may be used to guide shuttles from one location to another. The shuttles may be calibrated using the systems and methods for container shuttle calibration described herein.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of containers is used, shuttle calibration systems as described herein may be used.

Embodiments of the disclosure include systems and methods for systems and methods for container shuttle calibration. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
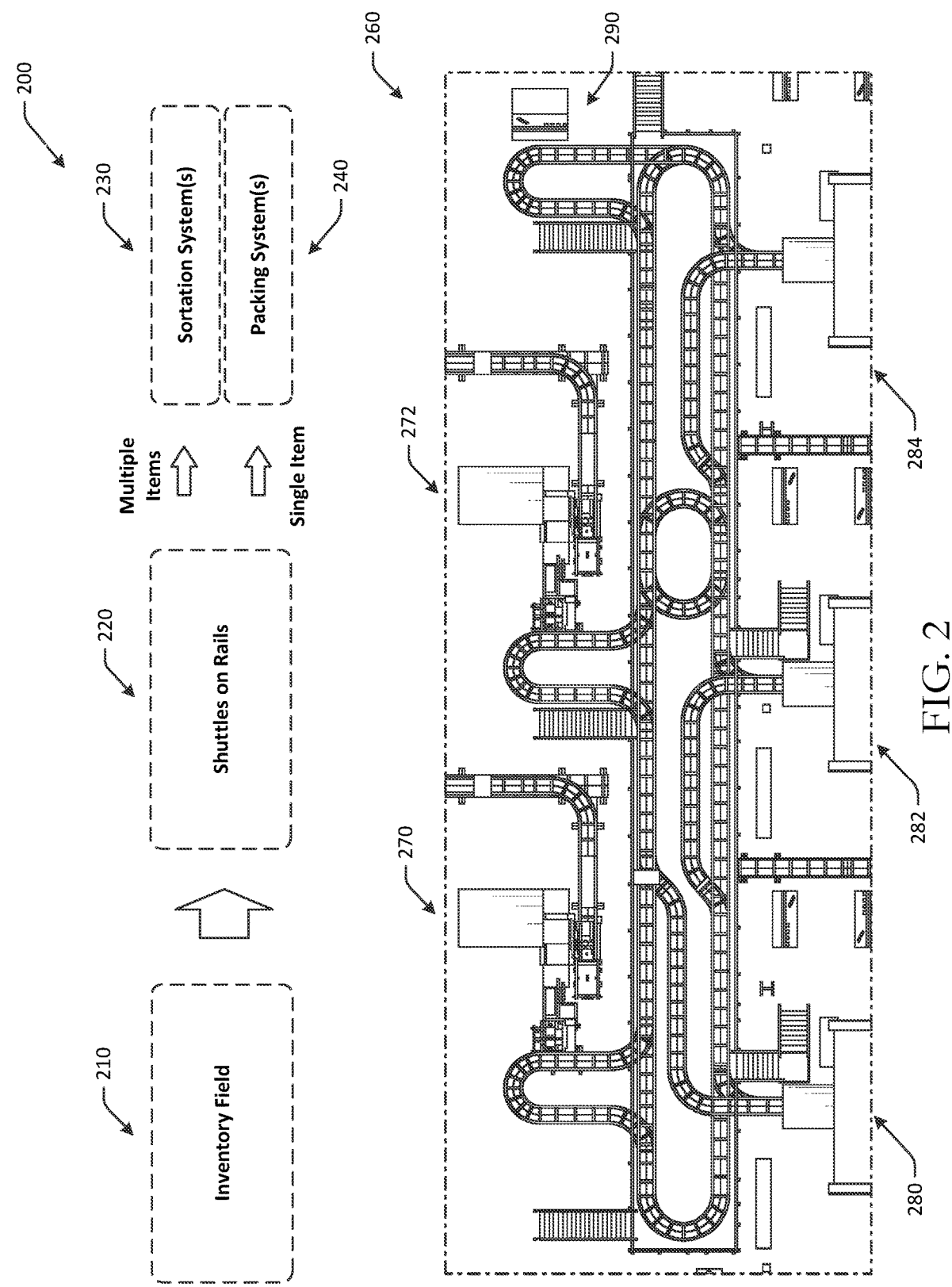
FIG. 2 is a schematic illustration of an example use case and facility layout for systems and methods for container shuttle calibration in accordance with one or more embodiments of the disclosure.

FIG. 2 is a schematic illustration of an example use case 200 and facility layout for systems and methods for container shuttle calibration in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using vehicles, or a combination thereof.

The picked products may be placed into one or more containers and the containers may be transported using one or more shuttles, such as one or more shuttles on rails 220. The shuttles on rails 220 may include container shuttles that are configured to transport items and/or containers from one location to another via rails. The rails may include switching rail components that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using switching rail components. Shuttles can be calibrated and removed from and/or reintroduced to the rail system 260 using the shuttle calibration mechanisms described herein. The rail system 260 may include rails that link various systems, such as sortation systems, to each other and/or to other systems, such as container handling systems, manual induction systems 290, and so forth. For example, the rail system 290 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off the conveyor belt. The shuttles may optionally include an onboard drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3:
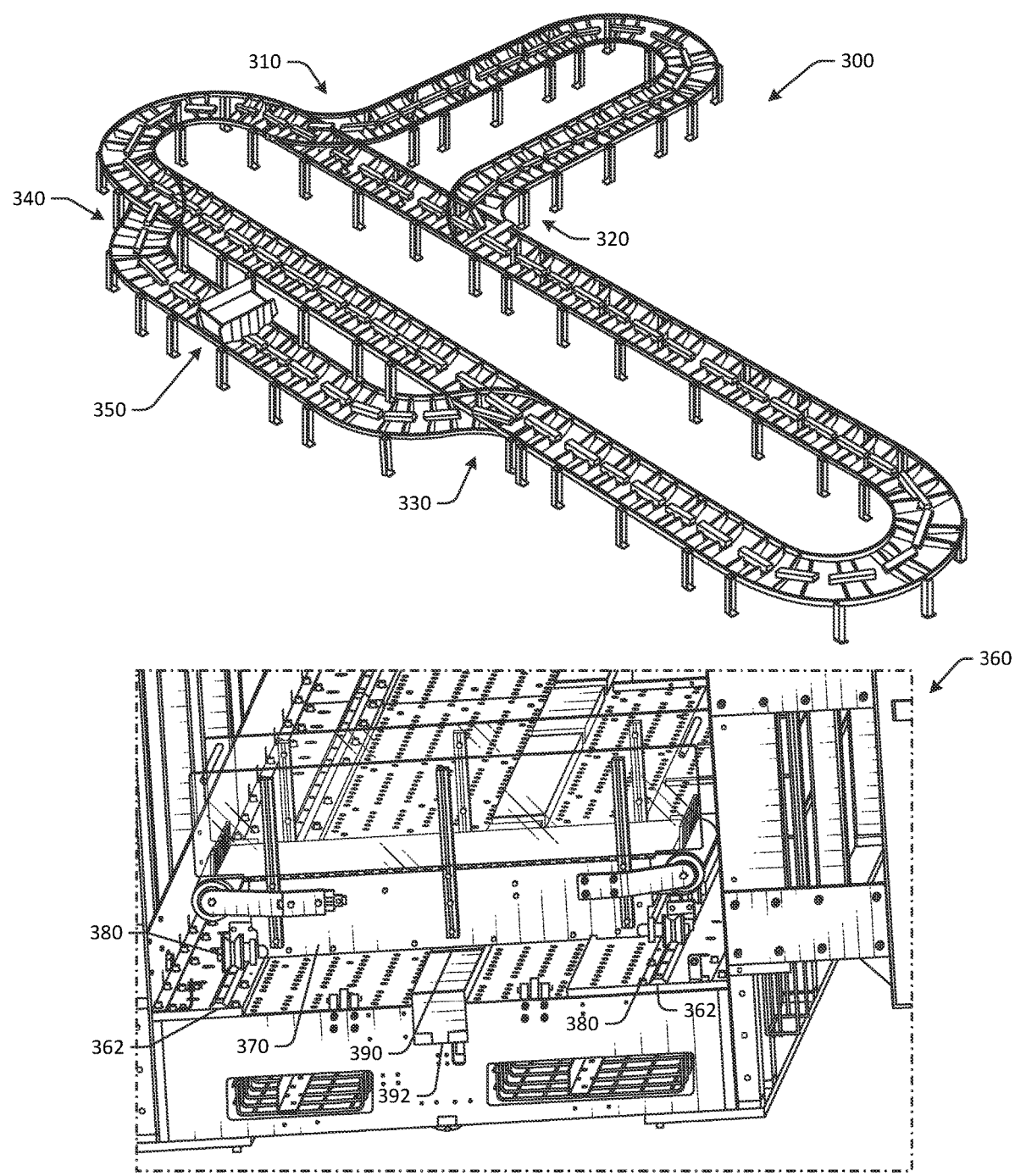
FIG. 3 is a schematic illustration of a perspective view of a shuttle rail system and a shuttle in accordance with one or more embodiments of the disclosure.

FIG. 3 is a schematic illustration of a perspective view of a shuttle rail system 300 and a shuttle in accordance with one or more embodiments of the disclosure. Other embodiments may include additional or fewer components. The illustration of FIG. 3 is not to scale, and may not be illustrated to scale with respect to other figures. The system illustrated in FIG. 3 may be used with the shuttle calibration mechanisms described herein, and/or may be used with any of the systems described herein.

The shuttle rail system 300 may be configured to provide continuous rail for switching the direction of a shuttle 350 in an electromagnetically propelled shuttle-on-rail arrangement. Shuttle-on-rail arrangements may be used in many systems, such as sortation systems, pick systems, delivery systems, etc. The shuttle rail system 300 may include rail switch mechanisms to allow the rail to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a narrow gap for optimal performance. Such factors may affect calibration tolerances for shuttles moving along the shuttle rail system 300.

Movement of the shuttle 350 from the shuttle rail system 300 at a curved section of rail may increase a likelihood of calibration issues. For example, the shuttle rail system 300 may include a first branched path 310, where if shuttles were moving along the shuttle rail system 300 in a clockwise direction, the shuttle could move in either a straight direction along the oval path of the shuttle rail system 300, or may make a left-handed curve onto a separate path of the shuttle rail system 300. Similarly, a second branched path 320 may allow for merging of shuttles that took a left curve at the first branched path 310 to merge back onto the oval path of the shuttle rail system 300. Any number of curved path and straight path intersections may be included in the shuttle rail system 300. For example, the shuttle rail system 300 may include a third branched path 330 and a fourth branched path 340.

As depicted in close-up perspective view 360, the shuttle 350 may include wheels 380 that move along a track 362 of the shuttle rail system 300. The shuttle 350 may include a base 370 to which a permanent magnet 390 may be coupled. The permanent magnet 390 may engage or otherwise interact with electromagnets 392 to electromagnetically propel the shuttle 350. The electromagnets 392 may therefore be a linear synchronous motor in some embodiments.

Although the shuttle 350 is depicted as traveling in a sideways configuration with respect to the shuttle rail system 300 (e.g., a payload on the shuttle 350 may be moving sideways with respect to the shuttle rail system 300, etc.), in other embodiments, the shuttle 350 may be oriented differently.

Figure 4:
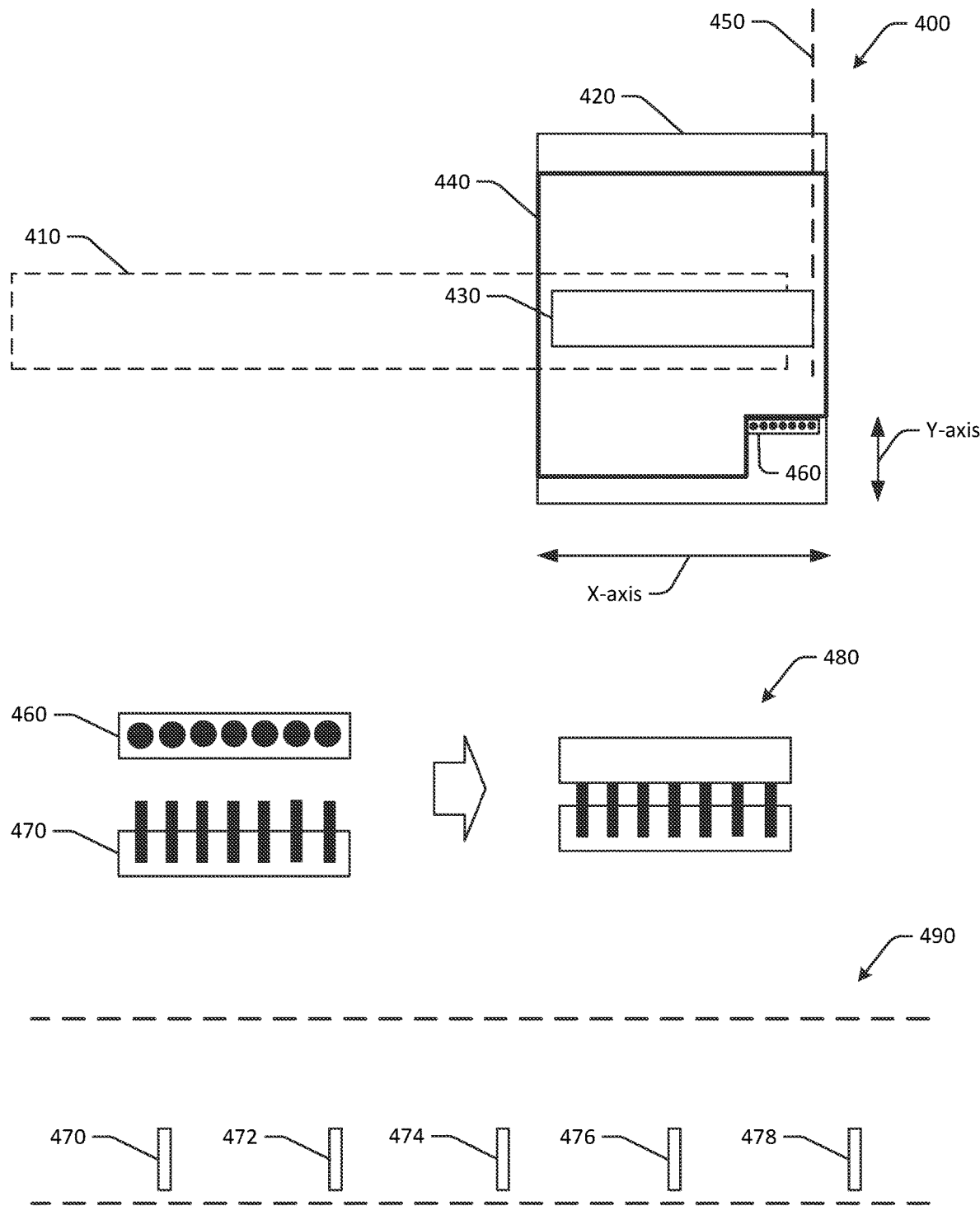
FIG. 4 is a schematic illustration of a shuttle calibration system and a shuttle power connector mechanism in accordance with one or more example embodiments of the disclosure.

FIG. 4 depicts a schematic illustration of a shuttle calibration system and a shuttle power connector mechanism in accordance with one or more example embodiments of the disclosure. Other embodiments may include additional or fewer components. The illustration of FIG. 4 is not to scale, and may not be illustrated to scale with respect to other figures. The systems illustrated in FIG. 4 may include the same shuttle calibration system discussed with respect to FIGS. 1-3.

In FIG. 4, a top schematic view of a shuttle 420 disposed on a shuttle calibration table 400 is depicted. The shuttle calibration table 400 may include a linear synchronous motor 410. The shuttle 420 may have a permanent magnet 430 disposed on a lower surface of the shuttle 420. The permanent shuttle 430 may interact with the linear synchronous motor 410 to propel the shuttle 420. The shuttle 420 may have no onboard power, or may have insufficient onboard power to power an onboard conveyor. Accordingly, the shuttle 420 may include one or more connectors 460 that engage with corresponding connectors along a track or other component of a shuttle rail system to provide power, command signals, etc. to the shuttle 420. To position the shuttle 420 at an optimal location for engagement of the connector 460 with the corresponding connector of the shuttle rail system, the shuttle 420 may be guided based on the positioning of the permanent magnet 430 with respect to the linear synchronous motor 410.

The permanent magnet 430 may have a physical edge 450 of its housing that is not necessarily aligned with an actual edge of the permanent magnet 430. The actual edge of the permanent magnet 430 may be determined via engagement with the linear synchronous motor 410. Accordingly, positioning of the connector 460 may be affected by actual positioning of the permanent magnet 430, as offsets may result in suboptimal placement of the connector 460.

Optimal positioning of the connector 460 may be determined by using a mechanical template 440 that correlates the actual edge of the permanent magnet 430 as determined using the linear synchronous motor 410 coupled to the calibration table 400. The mechanical template 440 may be used to determine positioning of the connector 460 in the X-axis direction, the Y-axis direction, and optionally the Z-axis direction (into and out of the page in the example of FIG. 4). By providing a fixed location for the connector 460 along the X-axis and the Y-axis, optimal positioning of the connector 460 may be achieved in a repeatable manner across shuttles, regardless of the difference in actual permanent magnet positioning. For Z-axis positioning, an operator may visualize the connector 460 to determine correct Z-axis positioning with respect to the template 440, and may modify Z-axis positioning, for example, by adding or removing shims or other components. Other types of non-mechanical templates, such as optical or laser-based templates, sensor-based measurement templates (e.g., time-of-flight sensors, etc.), can be used instead of mechanical templates.

Due to the complexity of shuttle rail systems, some of which may include several levels and different connector types, optimal positioning may increase throughput by decreasing the amount of time it takes for the shuttle to connect to a connector. An example connector is a pogo pin connector, which may engage with a pin-based connector 470 to provide power and/or command signals to the shuttle. When engaged, the engaged connectors 480 may include a slight depressing of the pins in the pin-based connector 470. As a result, if the shuttle is not in the proper position, not all of the pins may be depressed and power may not be transferred. Other types of connectors may have similar positioning tolerances.

In a schematic example of a top view of a shuttle rail system 490, a number of connectors, such as a first connector 472, a second connector 474, a third connector 476, a fourth connector 478, and so forth may be disposed along the track. The connectors may correspond to locations at which the conveyor of the shuttle may be operated. The connectors may have tolerances of 2-3 millimeters in some instances, illustrating the importance of optimal positioning of the connector 460 on the shuttle.

Figure 5A:
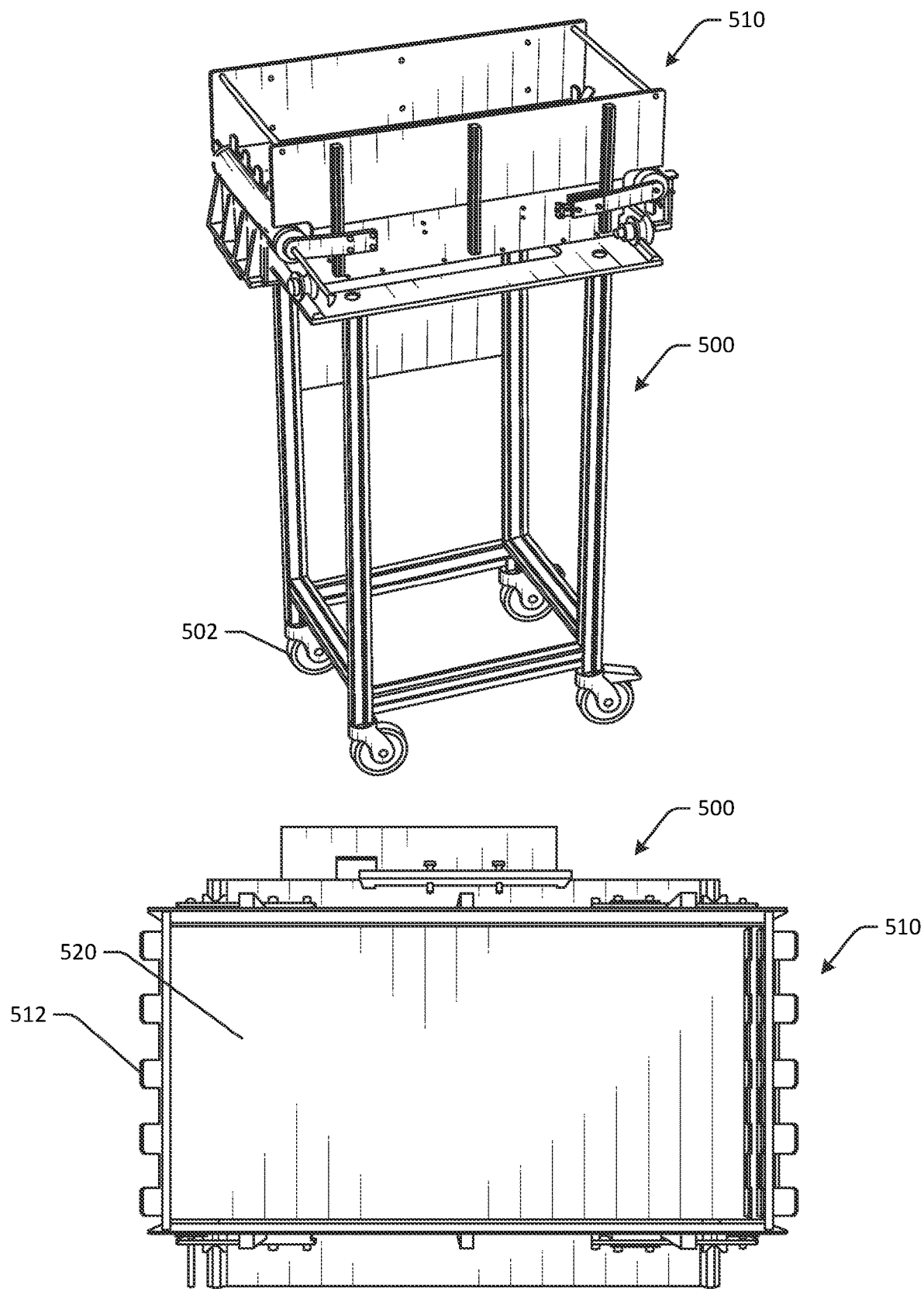
FIGS. 5A-5C are schematic illustrations of a shuttle calibration table in various views in accordance with one or more embodiments of the disclosure.
Figure 5B:
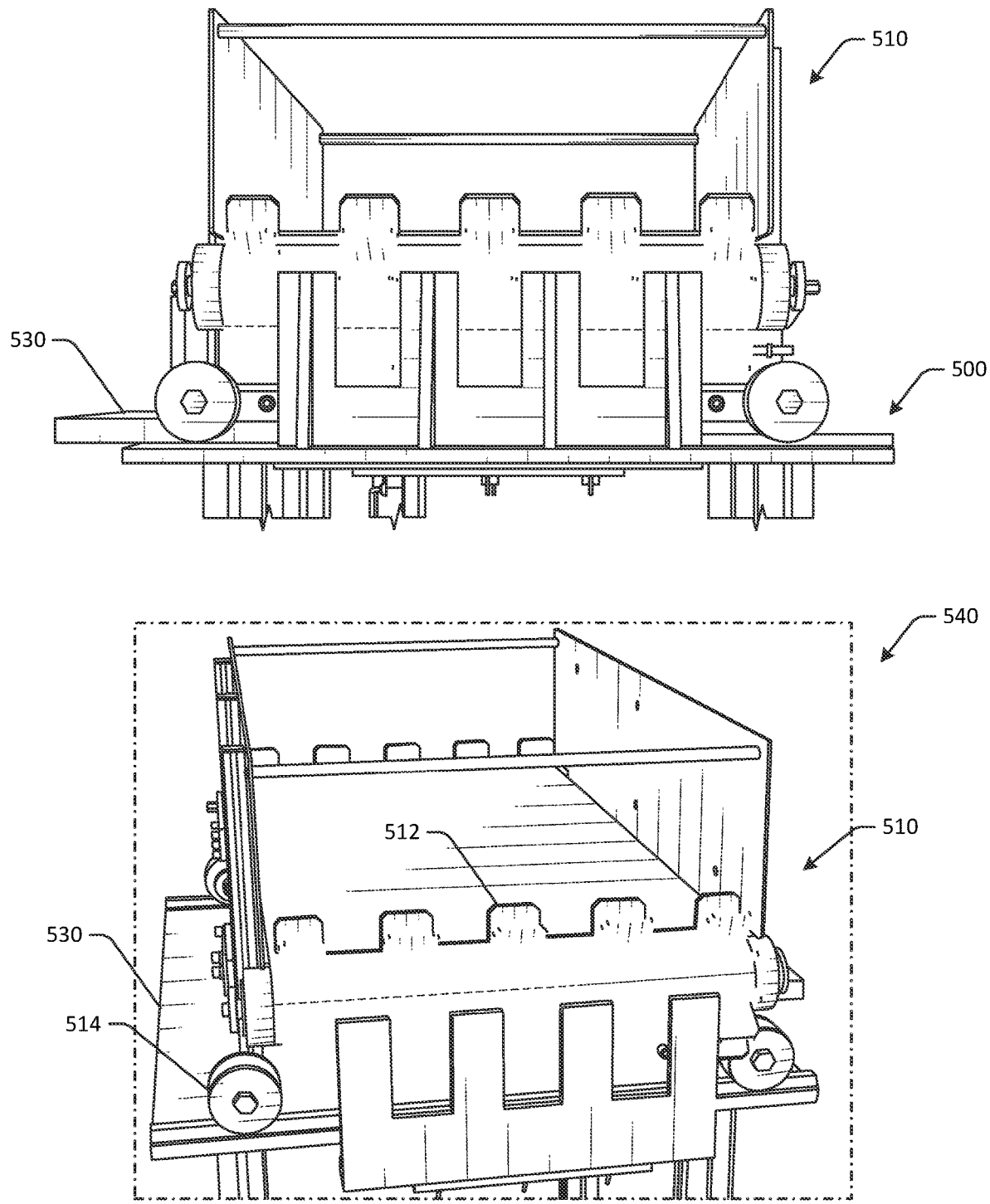
Figure 5C:
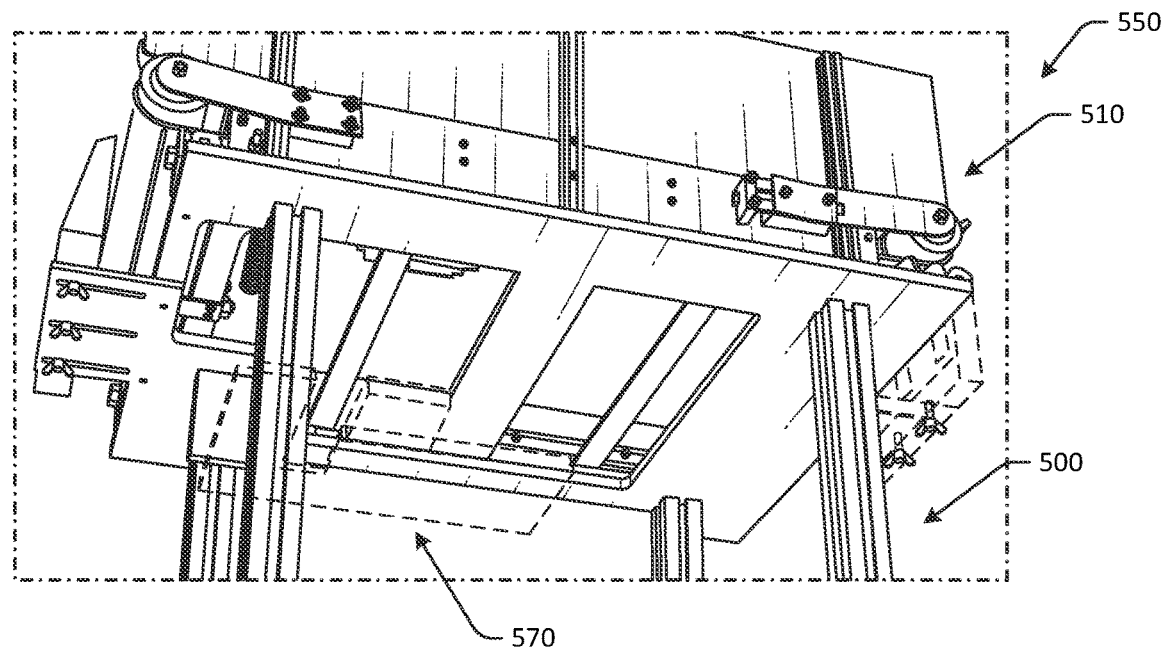
Figure 5C:
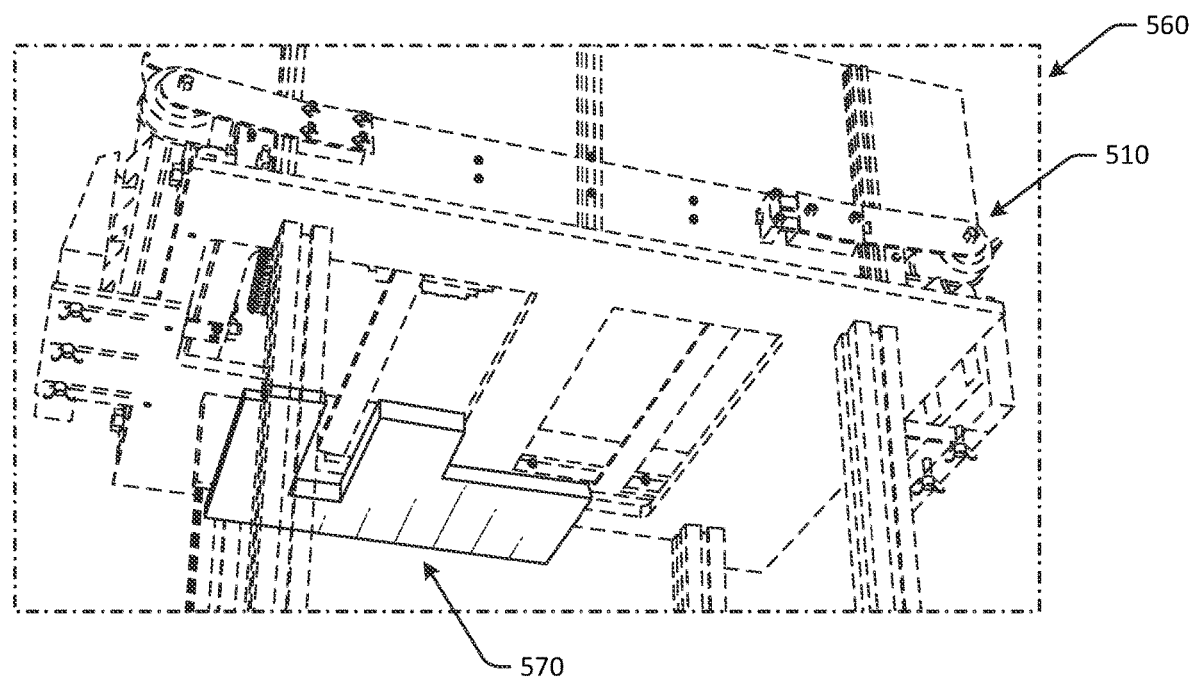

FIGS. 5A-5C depict a shuttle calibration table 500 in various views in accordance with one or more embodiments of the disclosure. Other embodiments may include additional or fewer components. The illustrations of FIGS. 5A-5C are not to scale, and may not be illustrated to scale with respect to other figures. The shuttle calibration table illustrated in FIGS. 5A-5C may be the same shuttle calibration mechanism discussed with respect to FIGS. 1-4.

In FIG. 5A, the shuttle calibration table 500 is depicted in perspective and top views with a shuttle 510 disposed thereon. The shuttle calibration table 500 may include wheels 502 for transportation to different locations within a facility. The shuttle 510 may include an onboard conveyor 520 with pleats 512 to transport items, container, or other objects.

In FIG. 5B, the shuttle calibration table 500 and shuttle 510 are depicted in side view and close-up perspective view 540. The shuttle calibration table 500 may include a surface 530 to which a linear synchronous motor or electromagnet may be coupled, and may include tracks onto which wheels 514 of the shuttle may be positioned. The tracks may be the same dimensions and have the same spacing as tracks of the shuttle rail system.

In FIG. 5C, the shuttle calibration table 500 and shuttle 510 are depicted in bottom perspective view with a mechanical template 570 used to position or otherwise locate a connector to be coupled to the shuttle 510. In a first drawing 550, the mechanical template 570 is depicted in dashed lines, and in a second drawing 560, the mechanical template 570 is depicted in solid lines. The mechanical template 570 may be positioned after determining the detected edge of the permanent magnet coupled to the shuttle, and may be used to determine optimal positioning of the connector for the shuttle 510.

Embodiments may therefore include a system with the shuttle 510, which may be configured to transport individual items from a first location to a second location using a set of rails, where the shuttle 510 may include a first set of wheels, such as wheels 514, disposed at a first side of the shuttle. The first set of wheels may be axially compliant. The shuttle 510 may include a second set of wheels disposed at a second side of the shuttle, where the second set of wheels may or may not be axially compliant, and in some instances may have a fixed axial position. The shuttle 510 may include a permanent magnet coupled to a lower surface of the shuttle 510. The system may include the calibration table 500 having the mechanical template 570 and an electromagnet, where the mechanical template 570 is configured to be moved with respect to the calibration table 500, and where the electromagnet is configured to engage with the permanent magnet on the shuttle 510. The calibration table 510 may be configured to calibrate the shuttle 510 by performing a method such as that described with respect to FIG. 6.

Figure 6:
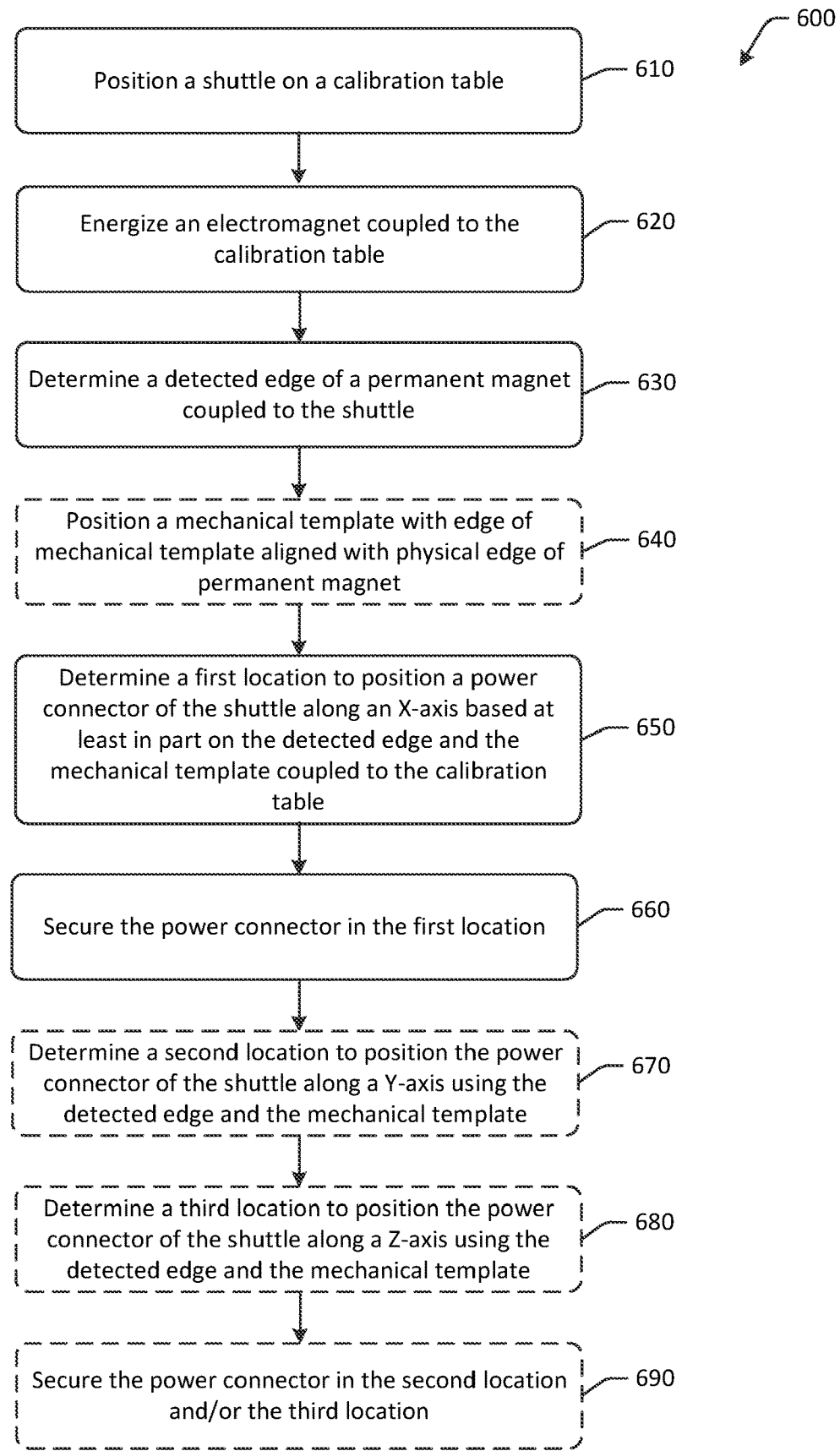
FIG. 6 is a schematic illustration of a method for shuttle calibration in accordance with one or more embodiments of the disclosure.

FIG. 6 is a schematic illustration of a method 600 for shuttle calibration in accordance with one or more embodiments of the disclosure. Other embodiments may include additional or fewer, or different, operations. The operations presented in the example of FIG. 6 may be optional and may be performed in a different order, and can be performed at least partially concurrently. The shuttle calibration mechanism described in FIG. 6 may be the same shuttle calibration mechanisms discussed with respect to FIGS. 1-5C.

The process flow 600 may be implemented to calibrate shuttles having permanent magnets. At block 610 of the process flow 600, a shuttle may be positioned on a calibration table. For example, as depicted in FIGS. 5A-5C, a shuttle may be removed from a shuttle rail system (e.g., that depicted in the example of FIG. 3, etc.), and may be positioned on a calibration table. The calibration table may be a mobile calibration table. The calibration table may include one or more electromagnets or linear synchronous motors disposed thereon and may include a power source. The shuttle may include a first set of wheels disposed along a first side of the shuttle, and a second set of wheels disposed along a second side of the shuttle. In some embodiments, at least one of the first set of wheels and/or the second set of wheels may be axially compliant. In other embodiments, at least one of the first set of wheels and/or the second set of wheels is not axially compliant. In some embodiments, the shuttle may be positioned right-side-up on the calibration table, whereas in other embodiments, the shuttle may be positioned upside down on the calibration table.

At block 620 of the process flow 600, an electromagnet coupled to the calibration table may be energized. The electromagnet may be a linear synchronous motor and may be powered with an external power source or a power source onboard the calibration table. Energizing the electromagnet may cause the electromagnet to interact with a permanent magnet coupled to the shuttle, and the shuttle may move into a certain position, such as a calibration position in which the shuttle is positioned at a predetermined location on the calibration table with respect to the electromagnet. The electromagnet may also be configured to engage the permanent magnet to secure the shuttle on the calibration table.

At block 630 of the process flow 600, a detected edge of the permanent magnet coupled to the shuttle may be determined. To determine the detected edge, due to the energized linear synchronous motor, the shuttle may be commanded to move to a defined calibration position (which may be the same for all shuttles), and when in the calibration position, the detected edge of the permanent magnet may be determined. The physical edge of the housing of the permanent magnet may not necessarily align with the detected edge, and may be evidenced by misalignment between the electromagnet housing and the permanent magnet.

At optional block 640 of the process flow 600, a mechanical template, such as that illustrated in FIG. 5C, may be positioned with an edge of the mechanical template aligned with a physical edge of the permanent magnet, or with a physical edge of the housing of the permanent magnet. The mechanical template may be manually positioned and may provide positional information for a connector relative to the physical edge of the permanent magnet or its housing. In some embodiments, the detected edge of the permanent magnet may be used as a datum instead of the physical edge, such that the true datum is the linear synchronous motor hall effect array encoder positional value. In some embodiments, a physical edge of the permanent magnet may be physically separated from the detected edge of the permanent magnet. The mechanical template may be optionally disposed at least partially between the first set of wheels of the shuttle and the power connector of the shuttle. The mechanical template may be secured to the shuttle. The mechanical template may be fixed in both the X-axis direction and Y-axis direction on the calibration table in some instances.

At block 650 of the process flow 600, a first location to position a power connector of the shuttle along an X-axis may be determined based at least in part on the detected edge and the mechanical template coupled to the calibration table. For example, the mechanical template may have one or more cutouts or other indicators used to provide positive X-axis positioning of the power connector. In some instances, based on where the shuttle is positioned in the calibration position, the power connector can be moved fore and aft until it contacts the mechanical template while the shuttle remains stationary on the calibration table.

At block 660, the power connector may be secured in the first location. To secure the power connector, the power connector may be held in place using screws, bolts, clamp, or other securing mechanisms. The power connector may therefore be fixed along the X-axis in an optimal position.

At optional block 670 of the process flow 600, a second location to position the power connector of the shuttle along a Y-axis may be determined based at least in part on the detected edge and the mechanical template coupled to the calibration table. For example, the mechanical template may have one or more cutouts or other indicators used to provide positive Y-axis positioning of the power connector. In some instances, based on where the shuttle is positioned in the calibration position, the power connector can be moved side to side until it contacts the mechanical template while the shuttle remains stationary on the calibration table. In some embodiments, the power connector may be moved into the correct Y-axis position by adjusting compliance of one set of shuttle wheels to correct the lateral positioning of the power connector. The datum for the Y-axis may be the wheels of the shuttle that do not have axial compliance. As the mechanical template on the calibration table is fixed in place and stationary, the power connector can be moved left or right until it contacts the mechanical template surface.

At optional block 680 of the process flow 600, a third location to position the power connector of the shuttle along a Z-axis may be determined based at least in part on the detected edge and the mechanical template coupled to the calibration table. For example, the mechanical template may have one or more indicators used to provide positive Z-axis positioning of the power connector. In some instances, Z-axis positioning of the power connector can be modified by adding or removing shims or other height adjustment components, such as mechanical blocks, that separate the power connector from a lower surface of the shuttle. For example, one or more shims can be added adjacent to the power connector to adjust a vertical positioning of the power connector. By adding shims or other components, the power connector can be moved further away from the shuttle, and by removing shims, the power connector can be positioned closer to the shuttle. In some embodiments, the positioning of the power connector in the Z-axis direction can be visualized and manually modified using shims or other components to correct the vertical positioning. As the power connector may be cantilevered, the vertical positioning in the Z-axis may account for any roll. Z-axis adjustments may be performed manually or automatically.

At optional block 690, the power connector may be secured in the second location and/or the third location. To secure the power connector, the power connector may be held in place using screws, bolts, clamp, or other securing mechanisms. The power connector may therefore be fixed along the Y-axis and/or the Z-axis in an optimal position.

Although discussed in terms of a power connector, other embodiments may be configured to optimally position different types of connectors, such as data transfer connectors, electrical connectors, and so forth.

Completion of some or all of the blocks in the process flow 600 can reduce variance in power connector positioning (or other types of connectors) from shuttle to shuttle, and will result in increased 'first chance' contact at the different corresponding connector locations at the different levels and/or tracks throughout the shuttle rail system (such as that illustrated in FIG. 4), due to the correlation between the detected edge and physical edge of the magnets on the individual shuttles.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
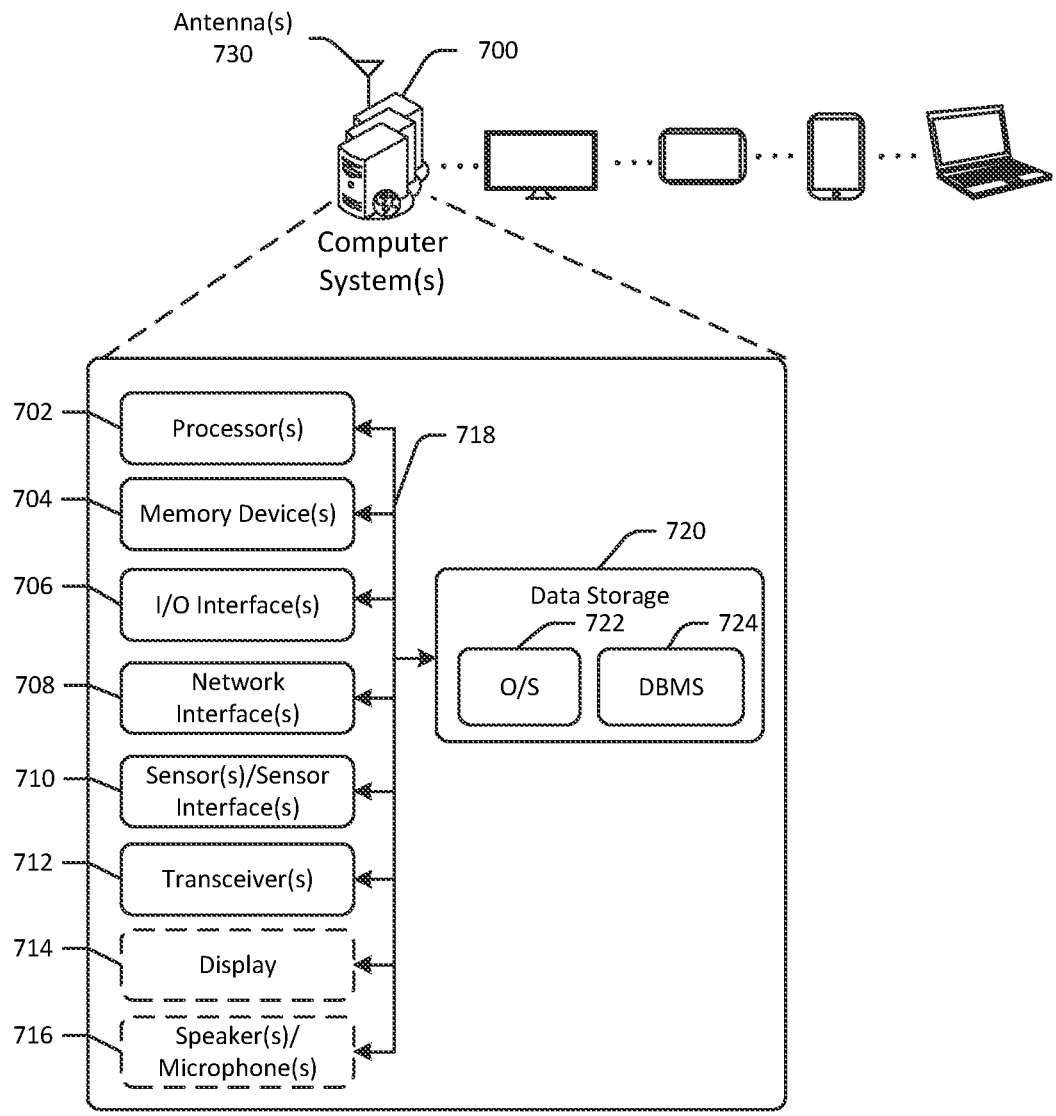
FIG. 7 schematically illustrates an example architecture of a computer system associated with a shuttle rail system in accordance with one or more embodiments of the disclosure.

FIG. 7 is a schematic block diagram of one or more illustrative computer system(s) 700 associated with a shuttle rail system in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the controller(s) of FIGS. 1-6. For example, the computer system(s) 700 may be a controller and may control one or more aspects of the systems and methods for container shuttle calibration described in FIGS. 1-6.

The computer system(s) 700 may be configured to communicate with one or more servers, user devices, or the like. The computer system(s) 700 may be configured to control rail switches, identify shuttles, direct shuttles, move shuttles, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:
1. A system comprising:
  a shuttle configured to transport individual items from a first location to a second location using the set of rails, the shuttle comprising:
    a first set of wheels disposed at a first side of the shuttle;
    a second set of wheels disposed at a second side of the shuttle; and
    a permanent magnet coupled to a lower surface of the shuttle; and
  a calibration table comprising a mechanical template and an electromagnet, wherein the mechanical template is configured to be moved with respect to the calibration table, and wherein the electromagnet is configured to engage with the permanent magnet on the shuttle;

wherein the calibration table is configured to be used for calibration of the shuttle by performing a method comprising:

positioning the shuttle on a calibration table;

energizing an electromagnet coupled to the calibration table;

determining a detected edge of the permanent magnet;

determining a first location to position a power connector of the shuttle along an X-axis based at least in part on the detected edge and a mechanical template coupled to the calibration table; and securing the power connector in the first location.

2. The system of claim 1, wherein the method further comprises:

causing the shuttle to move to a calibration position with respect to the detected edge of the permanent magnet.

3. The system of claim 1, wherein the method further comprises:

determining a second location to position the power connector of the shuttle along a Y-axis based at least in part on the detected edge and the mechanical template; and securing the power connector in the second location.

4. The system of claim 1, wherein the method further comprises:

determining a third location to position the power connector of the shuttle along a Z-axis based at least in part on the detected edge and the mechanical template;

adding one or more shims adjacent to the power connector to adjust a vertical positioning of the power connector; and securing the power connector in the third location.

5. A method for calibration of a shuttle coupled to a permanent magnet, the method comprising:

positioning the shuttle on a calibration table;

energizing an electromagnet coupled to the calibration table;

determining a detected edge of the permanent magnet;

determining a first location to position a connector of the shuttle along an X-axis based at least in part on the detected edge; and securing the connector in the first location.

6. The method of claim 5, further comprising:

causing the shuttle to move to a calibration position with respect to the detected edge of the permanent magnet.

7. The method of claim 5, further comprising:

position a mechanical template adjacent to the shuttle, wherein an edge of the template is aligned with a physical edge of the permanent magnet;

wherein determining the first location comprises determining the first location based at least in part on the detected edge and the mechanical template.

8. The method of claim 5, wherein the shuttle further comprises a first set of wheels disposed along a first side of the shuttle, and a second set of wheels disposed along a second side of the shuttle.

9. The method of claim 5, wherein determining the first location comprises determining the first location based at least in part on the detected edge and a template; and wherein the template is at least one of a mechanical template, an optical template, or a sensor-based measurement template.

10. The method of claim 5, wherein positioning the shuttle on the calibration table comprises positioning the shuttle upside down on the calibration table.

11. The method of claim 5, wherein the calibration table comprises the electromagnet, and wherein the electromagnet is configured to engage the permanent magnet to secure the shuttle on the calibration table.

12. The method of claim 5, wherein a physical edge of the permanent magnet is physically separated from the detected edge of the permanent magnet.

13. The method of claim 5, further comprising:

determining a second location to position the connector of the shuttle along a Y-axis based at least in part on the detected edge; and securing the connector in the second location.

14. The method of claim 13, further comprising:

determining a third location to position the connector of the shuttle along a Z-axis based at least in part on the detected edge; and securing the connector in the third location.

15. The method of claim 14, further comprising:

adding one or more height adjustment components adjacent to the connector to adjust a vertical positioning of the connector.

16. A method for calibration of a shuttle coupled to a permanent magnet, the method comprising:

positioning the shuttle on a calibration table, the calibration table comprising a mechanical template that is configured to be moved and an electromagnet;

energizing the electromagnet;

determining a detected edge of the permanent magnet;

de-energizing the electromagnet;

determining a first location to position a connector of the shuttle along an X-axis based at least in part on the detected edge and the mechanical template; and securing the connector in the first location.

17. The method of claim 16, further comprising:

causing the shuttle to move to a calibration position with respect to the detected edge of the permanent magnet.

18. The method of claim 16, wherein a physical edge of the permanent magnet is physically separated from the detected edge of the permanent magnet.

19. The method of claim 16, further comprising:

determining a second location to position the connector of the shuttle along a Y-axis based at least in part on the detected edge and the mechanical template; and securing the connector in the second location.

20. The method of claim 19, further comprising:

determining a third location to position the connector of the shuttle along a Z-axis based at least in part on the detected edge and the mechanical template; and securing the connector in the third location.

* * * * *